United States Patent

[11] 3,549,069

[72] Inventor Sadanobu Watanabe
Tokyo, Japan

[21] Appl. No. 745,001
[22] Filed July 15, 1968
[45] Patented Dec. 22, 1970

[73] Assignee Kabushikikaisha Taiko Denki Seisakusho
Tokyo, Japan
a corporation of Japan

[32] Priority July 17, 1967
[33] Japan
[31] Nos. 42/45960, 42/61804UM and 42/61805UM

[54] MAGNETIC TAPE CARTRIDGE PLAYER

2 Claims, 26 Drawing Figs.

[52] U.S. Cl. .......... 226/90
[51] Int. Cl. .......... G11b 15/24
[50] Field of Search .......... 226/181, 180, 186, 187, 176, 177, 90, 190, 194; 242/194, 197—200; 179/100.2Z, CA

[56] References Cited

UNITED STATES PATENTS

| | | | |
|---|---|---|---|
| 3,388,911 | 6/1968 | Wilson et al. | 179/100.2(CA) |
| 3,420,965 | 1/1969 | Townsend et al. | 226/90X |
| 3,437,762 | 4/1969 | Lear et al. | 179/100.2 |
| 3,445,116 | 5/1969 | Knox | 179/100.2(CA) |

*Primary Examiner*—Allen N. Knowles
*Attorney*—Hill, Sherman, Meroni, Gross and Simpson

ABSTRACT: A magnetic tape cartridge player having means for driving and reproducing a magnetic tape loaded in a cartridge inserted into a cartridge holder formed in the player, a pinch roller for driving the magnetic tape in cooperation with the aforementioned means, a plurality of cams, a pin engageable with each of the plurality of cams, means for selectively operating the pinch roller in accordance with the type of the cartridge inserted into the holder, and means for engaging the pin with one of the plurality of cams in association with the pinch roller operating means.

INVENTOR.
Sadanobu Watanabe

BY Hill, Sherman, Meroni, Gross & Simpson ATTORNEYS

INVENTOR.
Sadanobu Watanabe
BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanob Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

INVENTOR.
Sadanobu Watanabe

BY Hill, Sherman, Meroni, Gross & Simpson ATTORNEYS

MAGNETIC TAPE CARTRIDGE PLAYER

BACKGROUND OF THE INVENTION

1. Field of the Invention

This invention relates to a magnetic tape cartridge player for reproducing a signal recorded on a magnetic medium in a cartridge inserted into the cartridge holder of the player.

2. Description of the Prior Art

Conventional magnetic tape cartridge players have a defect that they cannot be used with a plurality of types of magnetic tape cartridges.

SUMMARY OF THE INVENTION

The present invention is directed to the provision of a magnetic tape cartridge player which can be used with a plurality of kinds of tape cartridges. The magnetic tape cartridge player of this invention has a specific pinch roller, means for selectively operating the pinch roller in accordance with the kind of the tape cartridge inserted into the cartridge holder and means for selectively operating a magnetic head in association with the pinch roller operating means.

DESCRIPTION OF THE PREFERRED EMBODIMENTS

Figure 1:
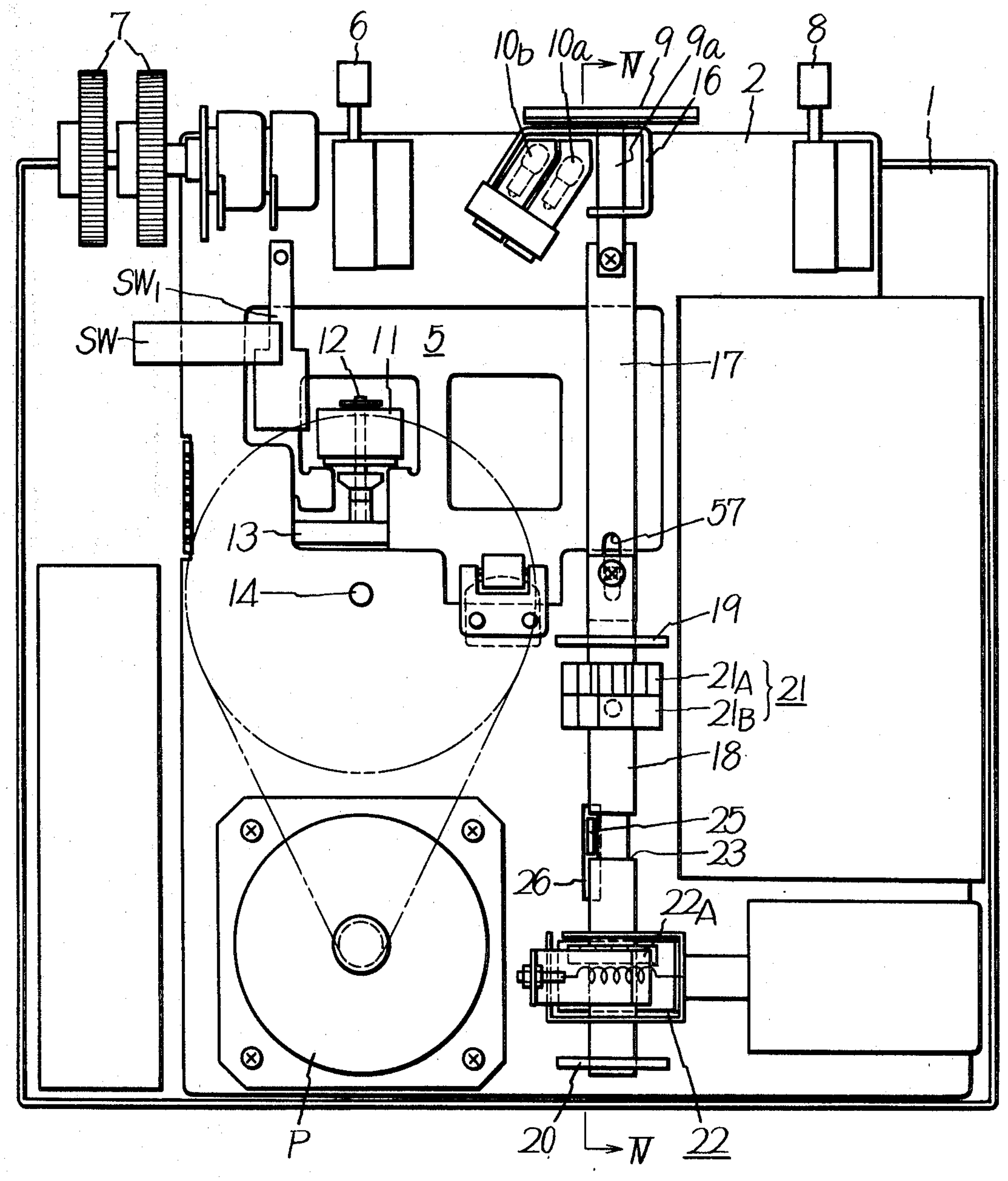
FIG. 1 is a top plan view schematically illustrating one example of a magnetic tape cartridge player produced according to this invention.

With reference to the drawings a description will be given of one embodiment of a magnetic tape cartridge player according to this invention.

FIGS. 1 to 4 are schematic explanatory diagrams illustrating generally one example of the magnetic tape cartridge player of this invention. Reference numerals 1 and 2 indicate lower and upper deck plates and, 3 and 4 guide side panels extending between the upper and lower deck plates 2 and 1, the lower and upper deck plates 1 and 2 and the side panels 3 and 4 defining a holder 5 for receiving or housing therein a magnetic tape cartridge. Reference numeral 6 designates a tone control switch button of, for example, pushbutton type, 7 volume control knobs, 8 a channel selector push button, 9 an indicator disc for indicating the channel of a tape being played back, and 10*a* and 10*b* lamps for illuminating the indicator disc 9. Reference numeral 11 identifies a pinch roller having its shaft 12 fixed to a rotary shaft 13 substantially at right angles thereto. Reference numeral 14 indicates a capstan driven by a motor. The indicator disc 9 has secured thereto one end of a shaft 9*a*, which is rotatably supported by an angle bracket 16, and the aforementioned lamps 10*a* and 10*b* are also held by the bracket 16. The other end of the shaft 9*a* has attached thereto one end of a strip-like coupling rod 17, the other end of which is secured to a shaft 18. The coupling rod 17 and the shaft 18 are interconnected in a manner to allow sliding movement of the latter in its lengthwise direction as will be described later. The shaft 18 is rotatably mounted on support plates 19 and 20 fixedly mounted on the upper deck plate 2. Mounted on the shaft 18 are a cam 21 consisting of cam discs 21A and 21B and a ratchet wheel 22A of a ratchet wheel mechanism 22. Further, the shaft 18 has formed therein at its intermediate portion a diametrically reduced portion 23 to serve as an engaging groove, with which the free end of an engaging lever 25 pivoted to an angle bracket 24 attached to the underside of the upper deck plate 2, is engaged through a window 26 bored through the upper deck plate 2.

Figure 2:
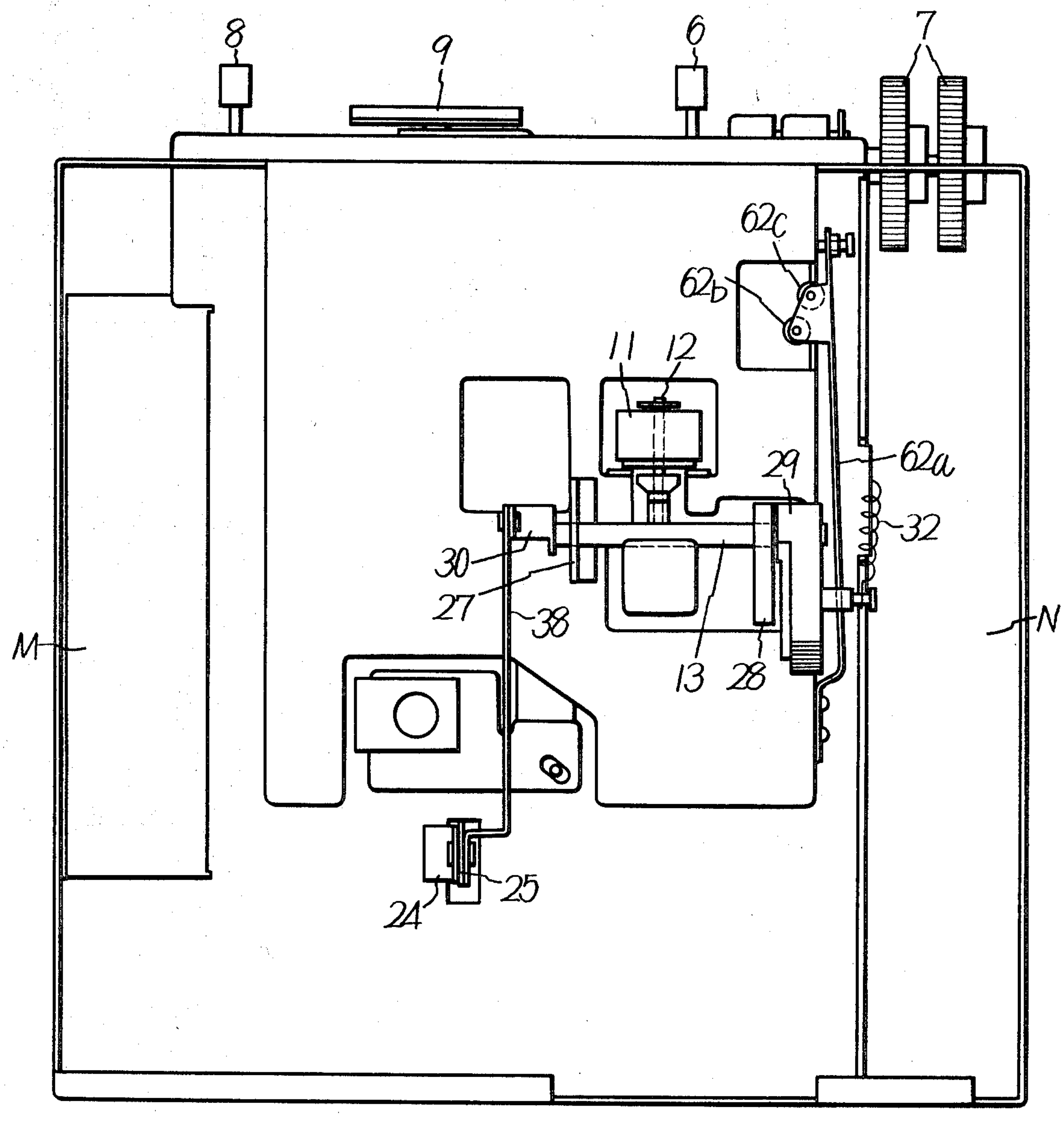
FIG. 2 is a bottom view of the player exemplified in FIG. 1.

The rotary shaft 13 of the pinch roller 11 is rotatably supported by fixed members 27 and 28 under the lower deck plate 1 and substantially parallel thereto (refer to FIG. 2). One end of the rotary shaft 18 has mounted thereon a lever 29 and the other end has attached thereto one end of a rotary lever 30. Reference characters M and N designate electric circuit elements of the player, which are supported by insulating plates secured to the deck plates 1 and 2. Reference character P indicates a motor, SW a switch attached to the upper deck plate 2 and $SW_1$ a spring similarly fixed at one end to the upper deck plate 2. The free end of the spring $SW_1$ projects into the cartridge holder 5 and is pressed into contact with the switch SW to close it when a cartridge is inserted into the holder 5.

Figure 3:
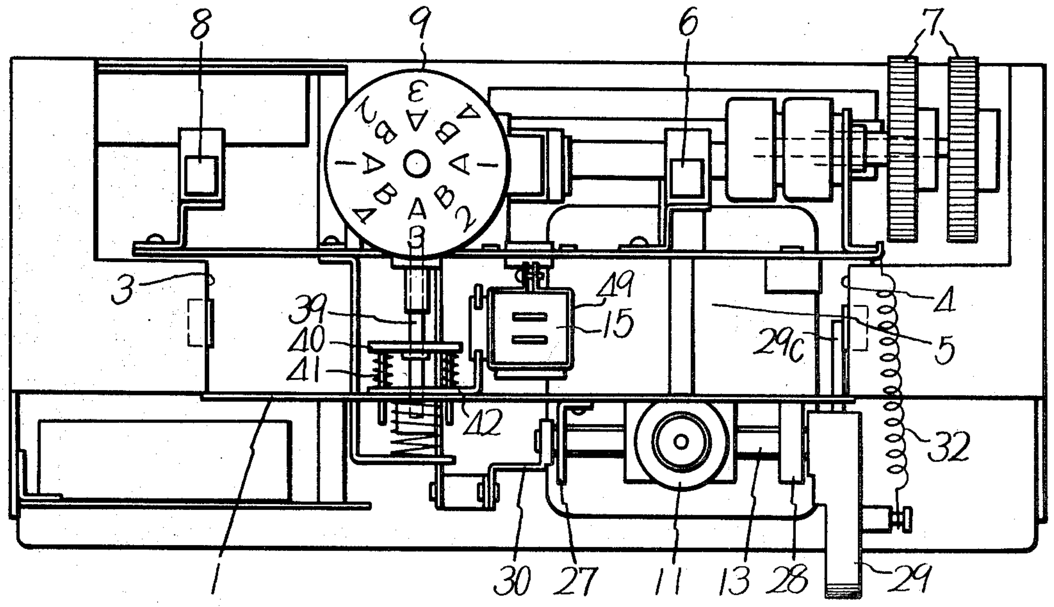
FIG. 3 is a front view of the player depicted in FIGS. 1 and 2.
Figure 4:
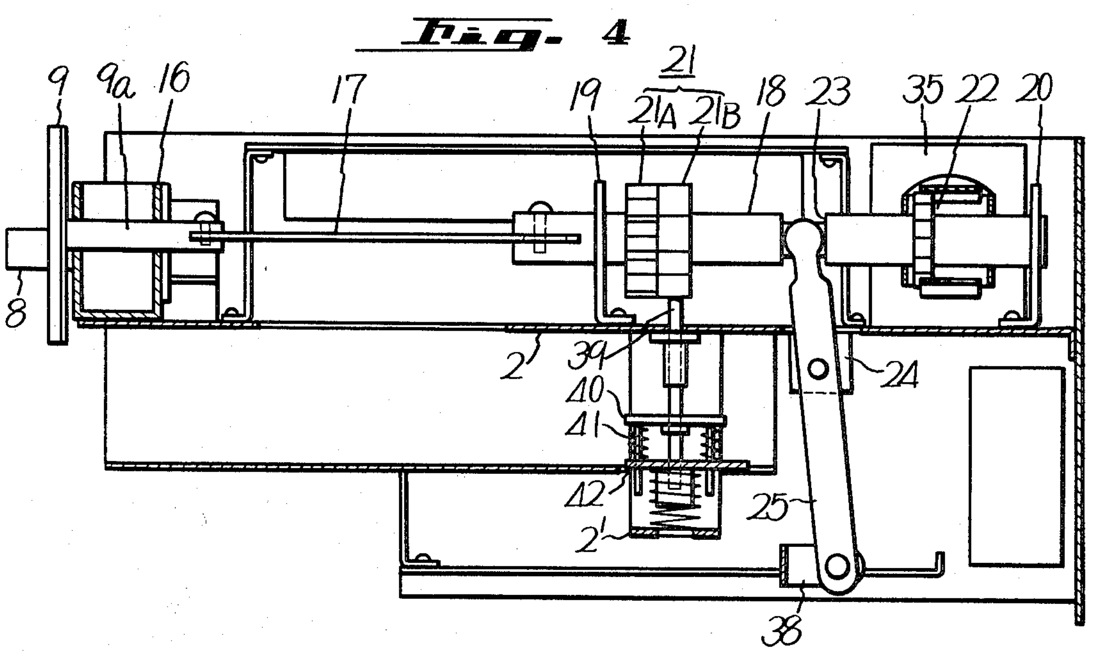
FIG. 4 is a cross-sectional view, partly cut away, taken along the line IV—IV in FIG. 1.
Figure 5:
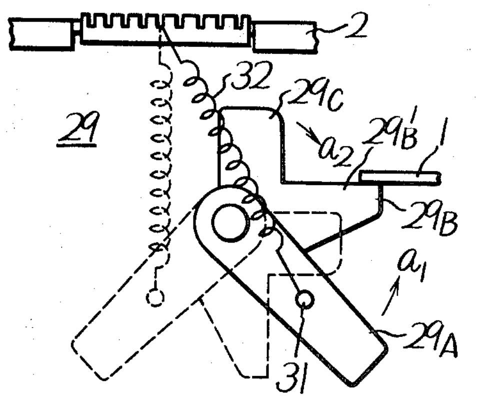
FIG. 5 is an enlarged schematic diagram of a pinch roller operating unit of the present invention.

Referring now to FIG. 5, a detailed description will be given in connection with the lever 29. The lever 29 consists of three arms 29A, 29B and 29C, and the arms 29B and 29C cross at right angles to each other. When the pinch roller 11 is in its inoperative position, namely its pinch roller shaft 12 lies parallel with the deck plate 1, and in other words when the pinch roller shaft 12 lies flat as shown in FIGS. 1 to 3, the lever 29 assumes a position such as indicated by full lines in the FIG. That is, the arm 29C stands upright to project into the cartridge holder 5 (refer to FIG. 3), and in this case one end face 29B′ of the arm 29B abuts with the underside of the lower deck plate 1 and functions as a stop. Further, a pin 31 is planted on the arm 29A at its free end portion and a spring 32 is stretched between the pin 31 and the upper deck plate 2. During the inoperative conditions of the pinch roller 11 the spring 32 acts to urge the arm 29B against the deck plate 1, that is, the spring 32 serves to turn the arm 29A in a direction of an arrow $a_1$ to lock the pinch roller 11 in its inoperative position. Then, when a cartridge having no pinch roller (as will be described later on) is pushed into the holder 5 the arm 29C projecting into the holder 5 is pushed down in a direction of an arrow $a_2$ by the forward end of the cartridge while at the same time the other arms 29A and 29B are turned to bring the lever 29 to a position indicated by dotted lines as depicted in FIG. 5. With the turning of the lever 29 in the direction of the arrow $a_2$, the rotary shaft 13 and the pinch roller shaft 12 are turned to bring the pinch roller 11 into contact with a capstan 14 through a window of the lower deck plate 1 and an opening 71 of the cartridge (refer to FIG. 20). In this case the spring 32 shifts to a position shown by dotted lines to render its line of action different from that in the case of the spring 32 lying in the position indicated by full lines. Namely, the spring 32 exerts a force to turn the arm 29A in the direction of the arrow $a_2$ to ensure engagement of the pinch roller 11 with the capstan 14. Since the portion of the upper deck plate 2 for attachment of the spring 32 is designed to permit shifting of the position of the top end of the spring 32, the resiliency of the spring 32 on the lever 29 can be adjusted to allow suitable adjustment of the pressure of the pinch roller 11 against the capstan 14.

Figure 6:
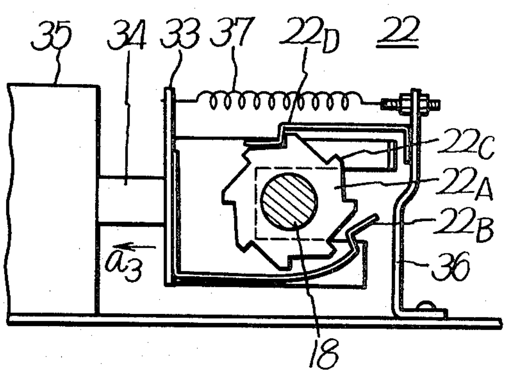
FIG. 6 is an enlarged schematic diagram of a ratchet unit employed in this invention.

Turning to FIG. 6, the ratchet mechanism 22 will hereinbelow be described in detail. The ratchet mechanism 22 consists of a ratchet wheel 22A having eight pawls $22C_1$ to $22C_8$ of the same shape and a click 22B, the ratchet wheel 22A being affixed to the shaft 18 as described above and the click 22B being secured to a bracket 33 at the end remote from the pawl 22B. The bracket 33 and the click 22B are fixed together to a rod 34 whose one end constitutes one part of a usual electromagnetic plunger 35. Since the electromagnetic plunger 35 is an ordinary one, no detailed description will be given thereof.

Upon pushing the aforementioned channel switch 8, the plunger 35 is actuated to pull the rod 34 in a direction of an arrow $a_3$, causing the click 22B to turn one of the pawls 22C of the ratchet wheel 22A by one pitch ($⅛\times 360°$, i.e. 45° in the illustrated example), so that the shaft 18, the cam discs 21A and 21B and the indicator disc 9 are also turned by the same angle. A click 22D is employed as a detent for the ratchet wheel 22A and is fixed at one end to a bracket 36 fixedly mounted on the upper deck plate 2. A spring 37 is stretched over the ratchet wheel 22A between the bracket 36 and the aforementioned bracket 33, by means of which the click 22B pulled by the plunger 35 is automatically returned to its initial position. The same result can be given by stretching the spring 37 between the stationary part of the plunger 35 and the bracket 33.

Magnetic tapes for use with presently available tape cartridges have four magnetic tracks (two channels) or eight magnetic tracks (four channels).

Figure 7:
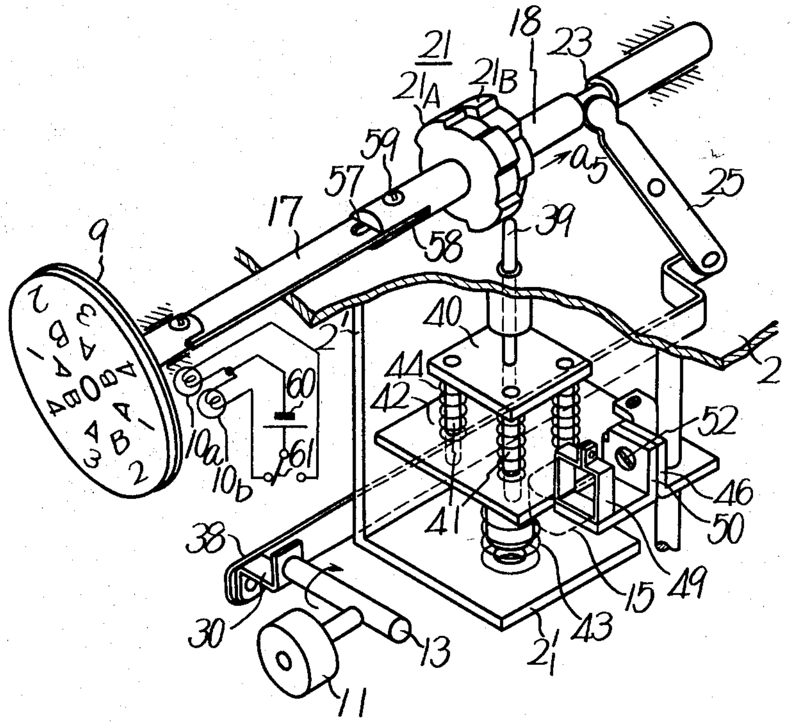
FIG. 7 is an enlarged perspective view, partly cut away, of a magnetic head support and operating unit in this invention.
Figure 8:
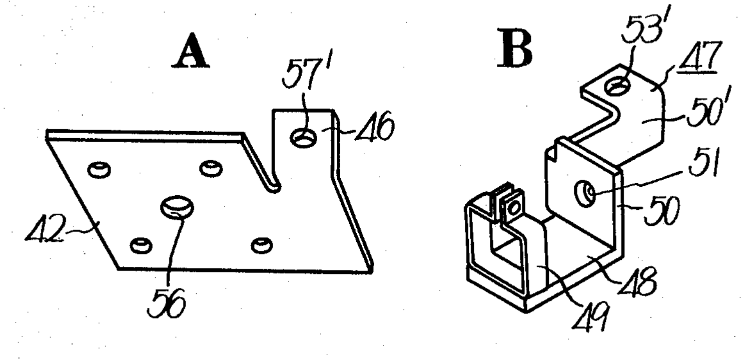
FIGS. 8A and 8B are enlarged perspective view of one part of the unit depicted in FIG. 7.
Figure 9:
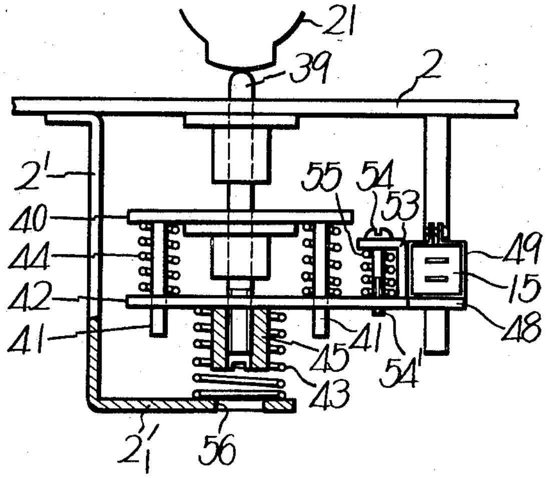
FIG. 9 is a side view of the magnetic head support unit shown in FIG. 7.

The playback instrument of this invention is provided with a channel selector unit which enables the instrument to be used with the four-and eight-track tape cartridges. With reference to FIGS. 7, 8, 9 and 11 one example of the channel selector unit will hereinbelow be described in detail. FIG. 7 is an enlarged view, partly in cross section, of one part of the principal part of the channel selector unit. As depicted in the FIG., the rotary shaft 13 of the pinch roller 11 has attached thereto one end of a rotary lever 30, the other end of which has pivoted thereto one of a coupling lever 38, the other end of the lever 38 being journaled to one end of the drive lever 25 pivoted at its intermediate point. The free end of the drive lever 25 is disposed in the engaging groove 23 formed on the peripheral surface of the shaft 18 in its lengthwise direction, as described previously, so that the shaft 18 may be thereby moved in its axial direction.

In the case where the pinch roller 11 lies flat as shown in FIG. 7, the free end of a pin 39 engaging the cam 21 abuts with the cam face of the cam disc 21B for use in the playback of the eight-track tape. When the pinch roller 11 stands upright the shaft 18 is moved by the drive lever 25 in a direction of an arrow $a_5$ and the free end of the pin 39 is urged into contact with the cam face of the cam disc 21A for use in the playback of the four-track tape. The pin 39 extends between the upper and lower deck plates 2 and 1 and is adapted to project from the upper deck plate 2 into contact with the cam disc 21A or 21B. The pin 39 is always pressed against the cam face of the cam disc 21A or 21B, so that when the cam discs 21A and 21B rotates together with the shaft 18 the pin 39 moves up and down while being pressed against the cam face of the cam disc 21A or 21B. That is, the pin 39 moves at right angles to the plane of the deck plate 1 or 2 to change the position of the magnetic head 15 (indicated by dotted lines in FIG. 7) in its widthwise direction relative to the magnetic tape. In this case the magnetic head 15 is caused to move in a direction at substantially right angles to the lengthwise direction of the magnetic tape by the movement of the pin 39 in its axial direction, but independently of this movement the position of the magnetic head 15 relative to the magnetic tape is adjusted, that is, the position of the pin 39 in its axial direction and the rotational angle of the magnetic head 15, namely the inclination angle of the gap of the magnetic head relative to the lengthwise direction of the magnetic tape are adjusted. To this end, a plate 40 is affixed to the pin 39 between the upper deck plate 2 and a substantially L-shaped angle bracket 2′ attached to the deck plate 2 and guide pins 41 are planted on the underside of the plate 40 and a plate 42 is disposed in such a manner as to be capable of being moved in the axial direction of the pin 39 by the guide pins 41. A coiled spring 43 is interposed between the plate 42 and the horizontal plate portion $2_1'$ of the bracket 2′, which spring normally biases the plate 42 toward the cam disc 21A or 21B. Meanwhile, coiled springs 44 are mounted on the guide pins 41 between the plates 42 and 40. Further, the lower end of the pin 39, that is, the portion projecting from the plate 42 toward the horizontal plate portion $2_1'$ of the bracket 2′ is threaded and a nut 45 is threadably mounted on the threaded portion of the pin 39. Thus, the pin 39, the plate 40, the springs 44, the plate 42 and the nut 45 are formed as a unitary structure, and the pin 39 is normally biased toward the cam disc 21A or 21B by the biasing force of the spring 43. Consequently, the plate 42 is moved by the action of the cam disc 21A or 21B in the same direction and at the same time as the movement of the pin 39 in its axial direction. As shown in FIG. 8A, the plate 42 extends to the back of the magnetic head 15 and the extending portion is bent at substantially right angles to provide a bent portion 46, to which the magnetic head 15 is attached by means of a head holder 47 such as depicted in FIG. 8B. With the holder 47, the magnetic head 15 is firmly mounted on the base plate 48 of the holder 47 by means of a clamp band 49 integrally attached to the base plate 48. The holder 47 has a coupling portion 50 bent at substantially right angles to the base plate 48 in opposing relation to the back of the magnetic head 15, and the coupling portion 50 has bored therethrough an aperture 51 of substantially the same size as that 51′ made through the bent portion 46 of the plate 42. A pin 52 is inserted into the apertures 51 and 51′ to assemble the head holder 47 with the plate 42 in a manner to allow fine adjustment of the position of the gap of the head 15. The coupling portion 50 is provided at its one side with an arm 50′ extending in parallel with the pin 52 inserted into the apertures 51 and 51′ of the coupling portion 50 and the bent portion 46 to couple them and the arm 50′ is bent at one side in a direction opposite to the pin 52 to provide a tab 53. The tab 53 has bored therethrough an aperture 53′, into which an adjustment screw 54 is inserted, and the other end of the screw 54 is screwed into a female screw 54′ formed in the plate 42, and a spring 55 is interposed between the tab 53 and the plate 42 on the adjustment screw 54 (refer to FIG. 9).

When the adjustment screw 54 is turned to move up or down, by which the tab 53 is turned about the pin 52 to cause the base plate 48 of the head holder 47 to move above the pin 52, thus accomplishing the adjustment of the inclination angle of the magnetic head 15 relative to the lengthwise direction of the magnetic tape. In this manner, the adjustment is achieved such that the magnetic gap of the magnetic head 15 and the magnetic tracks lie in substantially in parallel relation. Further, in order to adjust the position of the magnetic head 15 in the widthwise direction of the magnetic tape, an aperture 56 is bored through the horizontal plate portion $2_1'$ of the bracket 2′ at a place corresponding to the nut 45 and the nut 45 is turned with a driver inserted through the aperture 56, by which the position of the plate 42 is adjusted relative to the plate 40.

Simultaneously with the changeover of the magnetic track, the indication of the track being engaged with the magnetic head 15 is also changed over, which is indicated on the indicator disc 9. In this case the movement of the shaft 18 in its axial direction is not transmitted to the indicator disc 9 but only the rotation of the shaft 18 is transmitted to the indicator disc 9. Namely, when one end of the strip-like coupling rod 17 is coupled with one end of the shaft 18, a slot 57 is formed in one end of the coupling rod 17 at its center extending the lengthwise direction of the rod 17 (refer to FIG. 1), while a groove 58 for receiving the rod 17 is formed in the end of the shaft 18 (refer to FIG. 7). The end of the coupling rod 17 having the slot 57 is inserted into the groove 58 of the shaft 18 and the rod 17 and the shaft 18 are coupled together by clamping a screw 59 thereto in a manner to be inserted into the slot 57 of the coupling rod 17. This does not transmit to the rod 17 the movement of the shaft 18 in its longitudinal direction but allows the transmission of its rotation to the rod 17, so that the indicator disc 9 is turned together with the rod 17.

Figure 10:
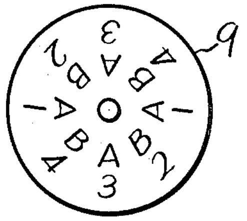
FIG. 10 is a front view of a channel indicator disc employed in this invention.
Figure 11:
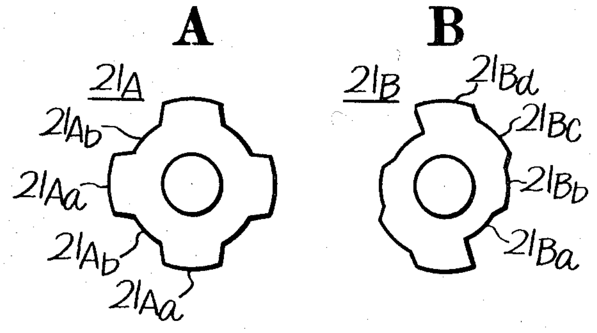
FIGS. 11A and 11B are enlarged front views of cam discs for two and four channel use which are employed in this invention.

The indicator disc 9 is a transparent plate, on the surface of which eight markings A, B, A, B, A, B, A and B are provided on an inner circumference at equiangular intervals about a rotary shaft 9*a* of the plate 9, and eight markings 1, 2, 3, 4, 1, 2, 3 and 4 corresponding to the above ones are provided on the disc 9 on an outer circumference, as shown in FIG. 10. In back of the indicator disc 9 there are disposed the lamp 10*a* opposite to one of the inner markings of the indicator disc 9 and the lamp 10*b* opposite to one of the outer markings. A power source 30 is switchingly connected to the lamps 10*a* or 10*b* through a switch 61. In this case the moving element of the switch 61 and the rotary lever 30 affixed to the rotary shaft 13 are interconnected so that the switch 61 is normally connected to the lamp 10*b* and is changed over to the lamp 10*a* when the pinch roller 11 stands up. In the angle bracket 16 supporting the lamps 10*a* and 10*b* there are provided two windows 10*a*′ and 10*b*′ at places corresponding to the indicator disc 9, through which windows the lamps 10*a* and 10*b* illuminate the markings on the indicator disc 9.

Referring now to FIGS. 11A and 11B, the cam 21 will hereinbelow be described. The cam 21 consists of the cam disc 21A for use in the playback of a four-track tape such as shown in FIG. 11A and the cam disc 21B for use in the playback of an eight-track tape such as depicted in FIG. 11B. The peripheral surface of the cam 21 is divided into eight substantially equal parts about the axis of the cam 21. The peripheral surface of the cam disc 21A consists of cam faces 21A*a* and 21A*b* alternately projecting and recessed at regular intervals, as illustrated in FIG. 11A. Namely, the pin 39 pressed against the cam disc 21A is caused to move up and down by such cam faces, by which the magnetic head 15 is moved up and down to select one channel of the four-track tape for playback. The one cam face 21A*a* causes the head 15 to select two stereophonic tracks and the other cam face 21A*b* causes the head 15 to select the other two stereophonic tracks. Meanwhile, the peripheral surface of the cam disc 21B includes eight substantially equally divided parts consisting of four pairs of cam faces 21B*a*, 21B*b*, 21B*c* and 21B*d* which are located at different circumferential positions about the shaft 18 in such a manner that the cam faces 21B*a*, 21B*b*, 21B*c* and 21B*d* sequentially go away from the shaft 18 and the outermost face 21B *d* is contiguous to the innermost one 21B*a*, as illustrated in FIG. 11B. Consequently, the cam disc 21B effects selective engagement of the head 15 with one of four channels in the same manner as the cam disc 21A such that the head 15 engages selected one of four sets of stereophonic tracks.

Figure 12:
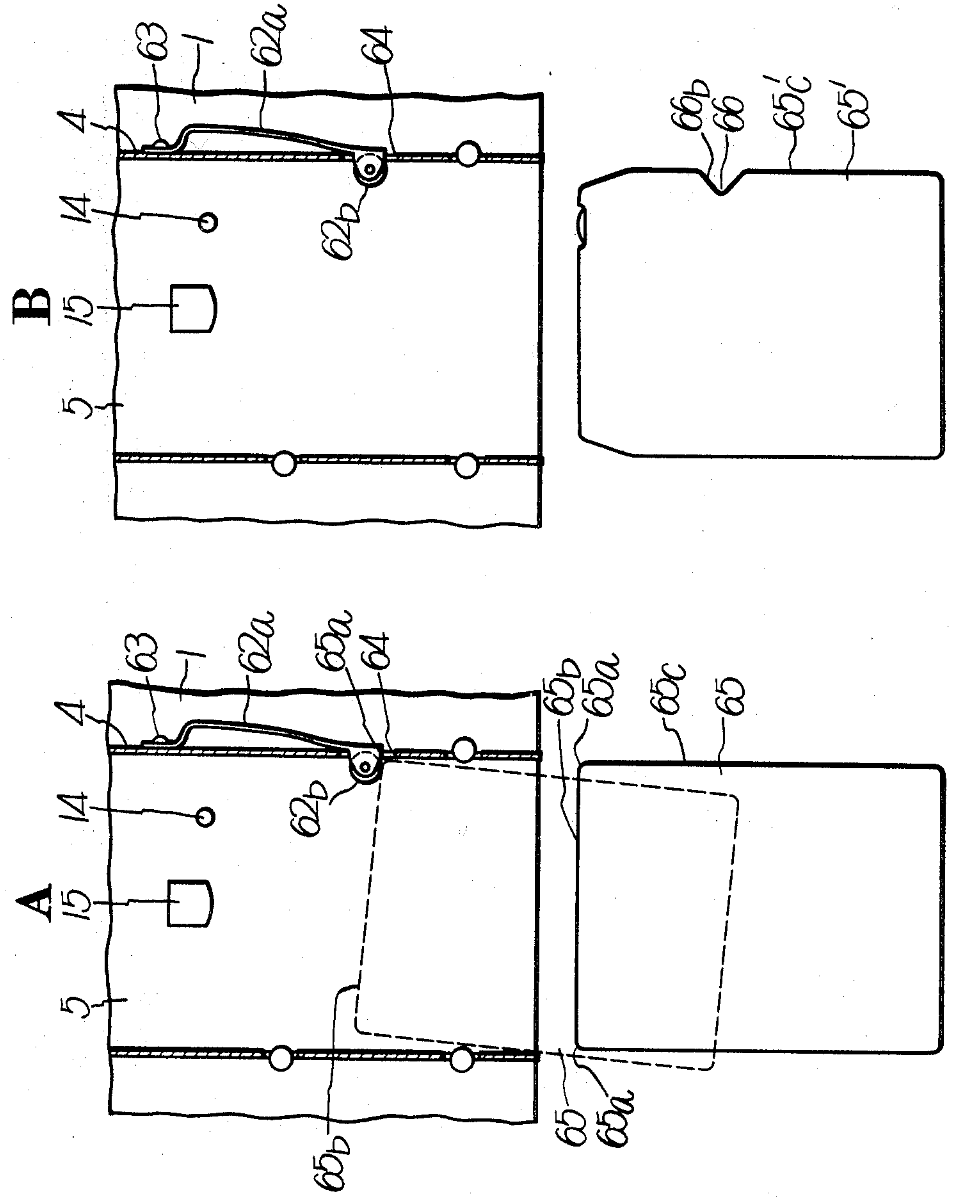
FIGS. 12A and 12B are schematic diagrams, for explaining the insertion of a four-track (two-channel) tape cartridge and eight-track (four-channel) tape cartridge into the cartridge holder provided with conventional cartridge loading means.
Figure 13:
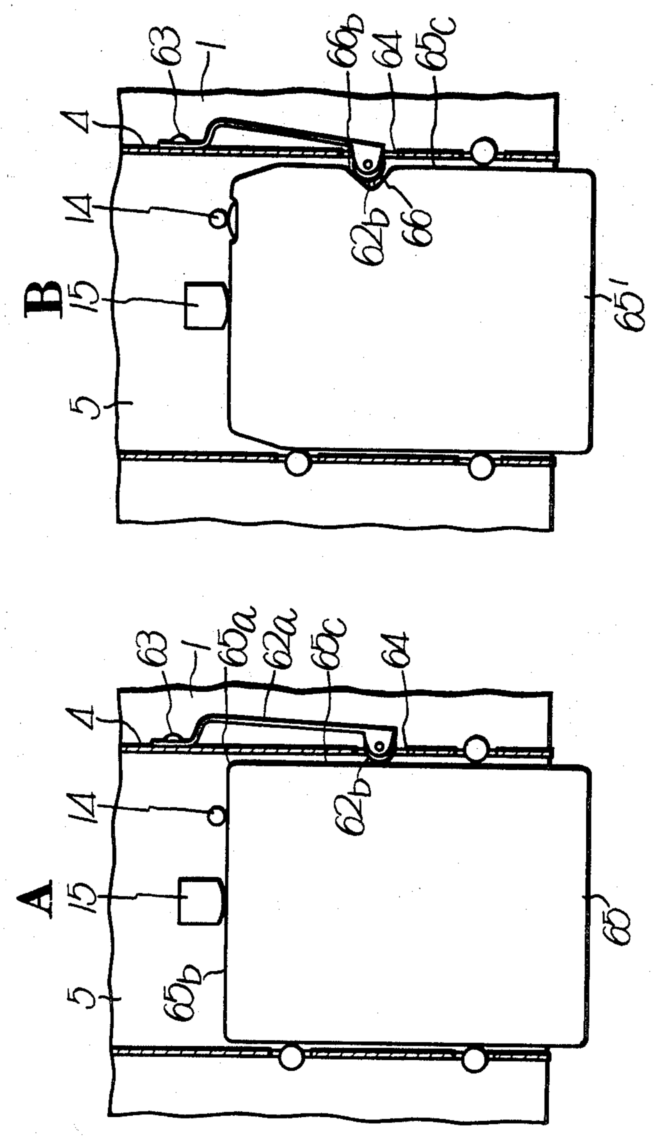
FIGS. 13A and 13B are schematic diagrams respectively showing the four-track tape cartridge and eight-track tape cartridge locked in their operative position in the cartridge holders equipped with the conventional cartridge loading means.

With reference to FIGS. 12 and 13 a description will hereinafter be given of one example of a cartridge loading means 62 employed in prior art tape playback instruments. As depicted in the FIGS. the means comprises a substantially L-shaped resilient plate spring 62*a* and a guide roller 62*b* attached to one end of the spring 62*a*. The end of the plate spring 62*a* remote from the roller 62*b* is secured, for example, by a screw 63, to the guide side panel 4 on the opposite side from the cartridge holder 5, and the plate spring 62*a* is biased so that the roller 62*b* may well project into the holder 5 from the outside thereof through a window 64 bored through the side panel 4.

When a four-track tape cartridge 65 is pushed into the cartridge holder 5, the roller 62*b* engages one side 65*c* of the cartridge 65 to guide it after pushed out of the holder 5 by a corner 65*a* of the cartridge 65 against the biasing force of the plate spring 62*a*, thus guiding the cartridge 65 into the holder 5 under such conditions as depicted in FIG. 13A. In the case of an eight-track tape cartridge 65′, its one side marginal portion 65*c*′ has formed therein a triangular groove 66 at a place corresponding to the window 64 of the side panel 4 under its operative condition, so that the roller 62*b* is snapped into the groove 66 and chiefly engages a wall 66*b* of the groove 66 on the side of the forward end of the cartridge 65′ to hold the cartridge 65′ in a manner to urge it in the direction of the capstan 14, namely to hold it in operative condition positively.

However, such conventional cartridge loading means as described above encounters a problem, which results from the fact that, in order to firmly hold the cartridge, especially the four-track tape cartridge, the plate spring 62*a* is designed to allow sufficient projection of the roller 62*b* attached to the free end thereof into the holder 5 in the absence of the cartridge (refer to FIG. 12). That is, when the cartridge 65 is inserted into the holder 5 in such a manner as indicated by dotted lines in FIG. 12A, namely when the cartridge 65 is pushed into the holder 5 obliquely to, for example, the side panel 4, the corner 65*a* of the forward end wall 65*b* of the cartridge 65 engages the roller 62*b* or its support in a manner to push it in the direction of the side panel 4, in which case there is not produced any component of a force for pushing the roller 62*a* out of the holder 5. In short, the roller 62*b* prevents the insertion of the cartridge 65 to make the playback of the tape impossible.

The present invention employs a cartridge loading means which is free from the aforementioned drawback. Referring now to FIGS. 14 to 17, one example of the means will be described. In the FIGS. similar elements to those in FIGS. 12 and 13 are identified by the similar reference numerals.

In the cartridge loading means of this invention a roller 62*b* (hereinafter referred to as a main roller) and another roller 62*c* (hereinafter referred to as an auxiliary roller) are mounted on the free end of a plate spring 62*a* and in this case the auxiliary roller 62*c* is located at a position further to the outside and the opening of the holder 5 than the main roller 62*b* relative to the holder 5. The important point of this arrangement is to locate the auxiliary roller 62*c* in such a position that the extension of a tangential line 67 of the surface of auxiliary roller 62*c* parallel with the side panel 4 in the holder 5 may lie a little further to the center of the holder 5 than a pin 62*b*′ of the main roller 62*b*.

Figure 15:
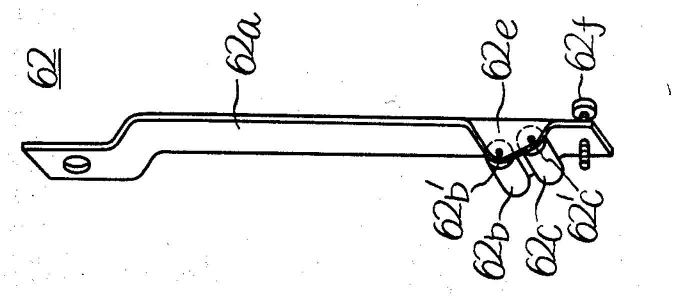
FIG. 15 is an enlarged perspective view of the cartridge loading means of this invention depicted in FIG. 14.
Figure 14:
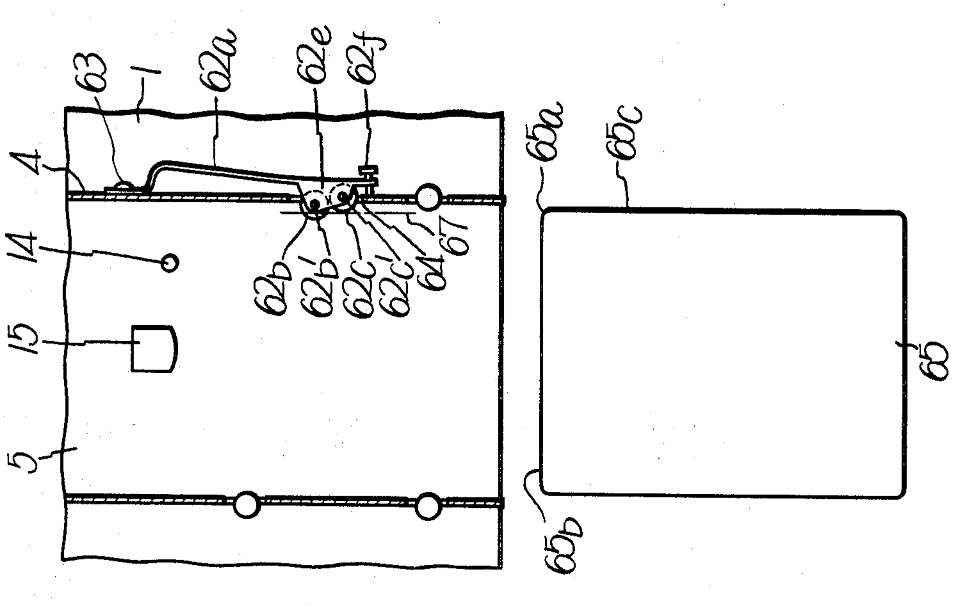
FIG. 14 is a schematic diagram illustrating a cartridge holder provided with cartridge loading means of this invention and a four-track tape cartridge.

FIG. 15 is an enlarged perspective view of one example of the cartridge loading means 62 for use in this invention, which will hereinbelow be described in detail. A substantially L-shaped plate spring 62*a* has at one end portion a pair of parallel lugs 62*d* and 62*e* serving as roller supports and the main and auxiliary rollers 62*b* and 62*c* are rotatably mounted on the plate spring 62 between the lugs 62*d* and 62*e* in the manner described above. Further, that end portion of the plate spring 62 having the lugs 62*d* and 62*e* is extended in its lengthwise direction and a screw 62*f* is screwed into a threaded hole bored through the extended end portion. The plate spring 62 is fastened at the other end by a screw 63 to the outside of the panel 4 of the holder 5 and is adapted such that the rollers 62*b* and 62*c* project into the holder 5 through a window formed in the side panel 4. In this case, since one end of the screw 62*f* abuts with the outside of the side panel 4, adjustment of the screw 62*f* leads to control of the degree of the projection of the rollers into the holder 5, ensuring control of the force of the rollers for holding the cartridge.

Figure 17:
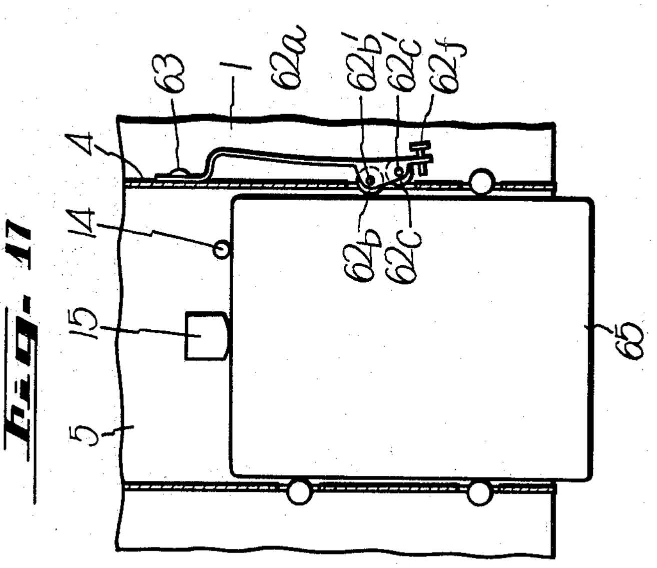
FIG. 17 is a schematic diagram, similar to FIG. 16, showing the cartridge in its operative position.
Figure 16:
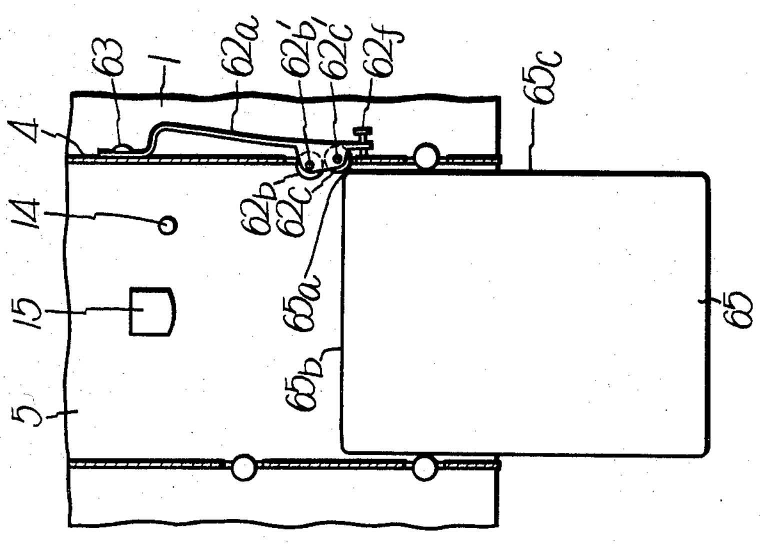
FIG. 16 is a schematic diagram showing the four-track tape cartridge in its one position while being inserted into the cartridge holder having the cartridge loading means of this invention depicted in FIG. 15.

If now the four-track tape cartridge 65 is inserted into the holder 5 provided with the above-described means, one corner 65*a* of the forward end face 65*b* of the cartridge 65 is firstly pressed against the auxiliary roller 62*c* disposed further to the opening of the holder 5 and to the side panel 4 than the main roller 62*b*. In this case the corner 65*a* of the cartridge 65 makes contact with the auxiliary roller 62*c* at a point further to the aforementioned tangential line 67 than the central pin 62*c'* of the roller 62*c*, so that the auxiliary roller 62*c* is subjected to a force tending to push it out of the holder 5 and hence is biased to the outside of the holder 5. Consequently, the main roller 62*b* mounted on the same lugs as the auxiliary roller 62*c* is also biased to the outside of the holder 5. As a result of this, the corner 65*a* of the cartridge 65 makes contact with the main roller 62*b* on the side further to the center of the holder 5 than the pin 62*b'* of the roller 62*b*, so that even if the cartridge 65 is inserted obliquely into the holder 5, its forward end does not abut with the roller 62*c* in a manner to push them in the direction of the side panel 4. Accordingly, the main roller 62*b* is also subjected to a force directed to the outside of the holder 5 and hence is biased outwardly, and consequently the cartridge 65 is guided by the main roller 62*b* into the holder 5 against the inwardly projecting force of the main roller due to the plate spring 62, thus bringing the cartridge 65 to its operative position such as shown in FIG. 17. The same results can be obtained with the eight-track tape cartridge.

The radius of the auxiliary roller 62*c* may be smaller but preferably larger than that of the main roller 62*b*. This is because of the fact that in the case of the radius of the auxiliary roller 62*c* being greater than that of the main roller 62*b*, since the corner 65*a* of the cartridge 65 engages the auxiliary roller 62*c* at a point further inside than the shaft 62*c'*, that is, at a point further to the center of the holder 5 than the shaft 62*c'*, there is no possibility of the auxiliary roller 62*c* preventing the insertion of the cartridge 65 for the reasons described previously and that since the auxiliary roller 62*c* is mounted between the supports 62*d* and 62*e* in a manner to dispose the tangential line 67 of the auxiliary roller 62*c* further to the inside of the holder 5 than the main roller 62*b*, the auxiliary roller 62*c* does not prevent the insertion of the cartridge and when the cartridge is inserted into the holder 5 the auxiliary roller 62*c* is greatly biased outward together with the main roller 62*b* to eliminate the possibility of the corner 65*a* of the cartridge 65 being caught by the main roller 62*b* as experienced in the prior art. The adjustment screw 62*f* does not make contact with the outside of the side plate 4 when the cartridge 65 has been completely inserted into the holder 5 up to its operative position, so that the main roller 62*b* always presses the cartridge 65 at a predetermined pressure. Further, the adjustment screw 62*f* enables positioning of the main roller 62*b* and the auxiliary roller 62*c* at such predetermined locations as described above, and consequently dispersion in the magnetic recording and reproducing device or in the shape of the plate spring 62*a* can easily be compensated for by the adjustment of the screw 62*f*.

Further, the eight-track tape cartridge has such a groove 66 as mentioned previously which is different in shape, size and position depending upon the particular type of the cartridge, but the position of the roller 62*b* can be adjusted by the screw 62*f* in a manner to be pressed against groove 66 at a predetermined pressure irrespective of its shape, size and position.

Figure 18:
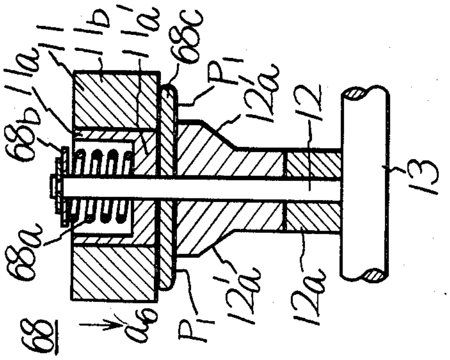
FIG. 18 is an enlarged cross-sectional view of a pinch roller unit produced according to this invention.

A detailed description will be given of a pinch roller unit 68 of the present invention. FIG. 18 is an enlarged longitudinal-sectional view schematically illustrating the pinch roller 11, the pinch roller shaft 12 and members in their vicinity. As depicted in the FIG., the pinch roller unit 68 consists chiefly of the pinch roller shaft 12 affixed to the rotary shaft 13 at substantially right angles thereto and the pinch roller 11 rotatably mounted on the free end of the shaft 12 in a manner to be moveable in the axial direction of the shaft 12.

A sleeve 12*a* is mounted about the pinch roller shaft 12 at its lower end portion and the pinch roller 11 is made up of a metal cup-shaped inner layer 11*a* directly but rotatably mounted about the shaft 12 and a ring-shaped outer layer 11*b* formed of an elastic material such as rubber or the like which is mounted about the inner layer 11*a* so as to mount the pinch roller 11 on the free end of the shaft 12 in a manner to be slidable in its axial direction and rotatable about the shaft 12. The bottom 11*a'* of the cup-shaped inner layer 11*a* has bored therethrough at its center a hole, through which the shaft 12 is passed to bring the bottom 11*a'* into abutment with the upper free end portion of the sleeve 12*a*. A coiled spring 68*a* is inserted between the upper end of the shaft 12 and the bottom 11*a'* of the inner layer 11*a* about the shaft 12, and the upper free end of the coiled spring 68*a* is secured to a flange 68*b* attached to the upper free end of the shaft 12 while the lower free end of the coiled spring 68*a* is attached to the bottom 11*a'*, thus preventing the spring 68*a* from slipping off the cup-shaped inner layer 11*a*. In addition, the resiliency of the coiled spring 68*a* is such as always pushes the pinch roller 11 toward the rotary shaft 13, namely in a direction indicated by an arrow $a_6$. A washer 68*c* may be mounted about the shaft 12 between the sleeve 12*a* and the pinch roller 11, and the washer 68*c* may or may not be in contact with the pinch roller 11. The washer 68*c* may be a plate-like ring formed of relatively slippery and hard synthetic resin such as, for example, Teflon (Trademark) or nylon. In addition, the outer diameter of the washer 68*c* is selected a little smaller than that of the outer layer 11*b* to prevent the washer 68*c* from engaging the capstan 14 when the pinch roller 11 is in tight contact with the capstan 14. The sleeve 12*a* gradually increases its diameter as it approaches the pinch roller 11 to provide a conical portion 12*a'*. It is preferred to form the washer 68*c* in such a conical configuration which increases its diameter as it approaches the pinch roller 11. The peripheral surface of the conical portion 12*a'* of the sleeve 12*a* does not extend to the pinch roller 11 and instead terminates a little before the pinch roller 11 to provide a rim parallel with the shaft 12, leaving a relatively wide flat area $P_1$ between the periphery of the outer layer 11*b* of the pinch roller 11 or the washer 68*c* and the periphery of the upper end portion of the sleeve 12*a*. This area $P_1$ faces opposite to guide members 69 and 69' of the pinch roller 11 which are downturned from the lower deck plate 1.

Generally, the shape and position of the opening 71 of the cartridge 65 cannot be freely selected but depend upon the relative arrangements of a reel 67*r* encased in the cartridge 65 and having wound thereon a tape 65*g*, a reel stopper 65*e* and a magnetic head to be engaged with the tape 65*g*. It is a very important problem how to bring the pinch roller 11 into the cartridge 65 through the opening 71 of such a restricted shape and position, but this problem can be settled by a pinch roller drive unit 68 of this invention.

Figure 19:
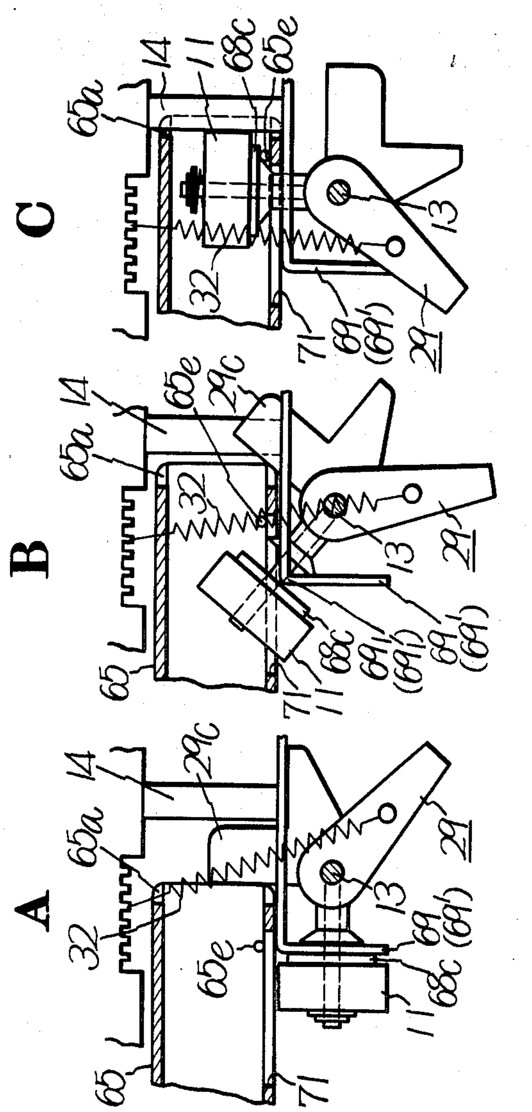
FIGS. 19A to 19C, inclusive, are schematic diagrams illustrating the movement of the pinch roller shown in FIG. 18 from its inoperative position to its operative position in accordance with insertion of the two-channel tape cartridge.

Turning now to FIGS. 19A, 19B and 19C, the operation of the pinch roller drive unit 68 will hereinbelow be described. During its inoperative condition the pinch roller 11 assumes such a position as illustrated in FIG. 19A. Pushing the cartridge 65 including, for example, a four-track tape into the cartridge holder 5, its forward end corner 65*a* is firstly urged against the arm 29*c* of the lever 29 projecting into the holder 5. Under this condition, the cartridge 65, especially its opening 71 and reel stopper 65*e* have not as yet reached a position where the pinch roller 11 can be brought into the cartridge 65, in which case the pinch roller 11 is still held in its inoperative position in the present invention. Further insertion of the cartridge 65 into the holder 5 causes the aforementioned corner 65*a* to push the arm 29*c* of the lever 29, with the result that the rotary shaft 13 rotates correspondingly to turn the pinch roller shaft 12. The pinch roller 11 and the washer 68*c* move on the shaft 12 in its axial direction while sliding on the guide members 69 and 69', so that one portion of the pinch roller 11 projects into the cartridge 65 through the window 70 of the lower deck plate 1 and the opening 71 of the cartridge 65, as depicted in FIG. 19B. While the pinch roller 11 slides on the shaft 12 in its axial direction, the opening 71 of the cartridge 65 and the reel stopper 65*e* projecting across the opening 71 in the cartridge 65 are brought to such a position where the pinch roller 11 can well be brought into the cartridge 65. When the cartridge 65 has been further inserted into the holder 5 and the pinch roller 11 and the washer 68*c* have got over corners $69_1$ and $69_1'$ of the guide members 69 and 69' after sliding thereon, the pinch roller 11 is automatically snapped into tight contact with the capstan 14 by the action of the spring 32. In this case the degree of the movement of the pinch roller 11 on the shaft 12 in its axial direction is selected to comply with the degree of the insertion of the cartridge 65 so that the conical portion 12*a*' of the sleeve 12*a* may abut with the reel stopper 65*e* to push it toward the capstan 14. As a result of this, when the cartridge 65 has reached its operative position as shown in FIG. 19C the pinch roller 11 is pressed against the capstan 14 at a suitable pressure. It is a matter of course that the head 15 is in contact with the tape 65*g* in the condition such as shown in FIG. 19C.

Figure 20:
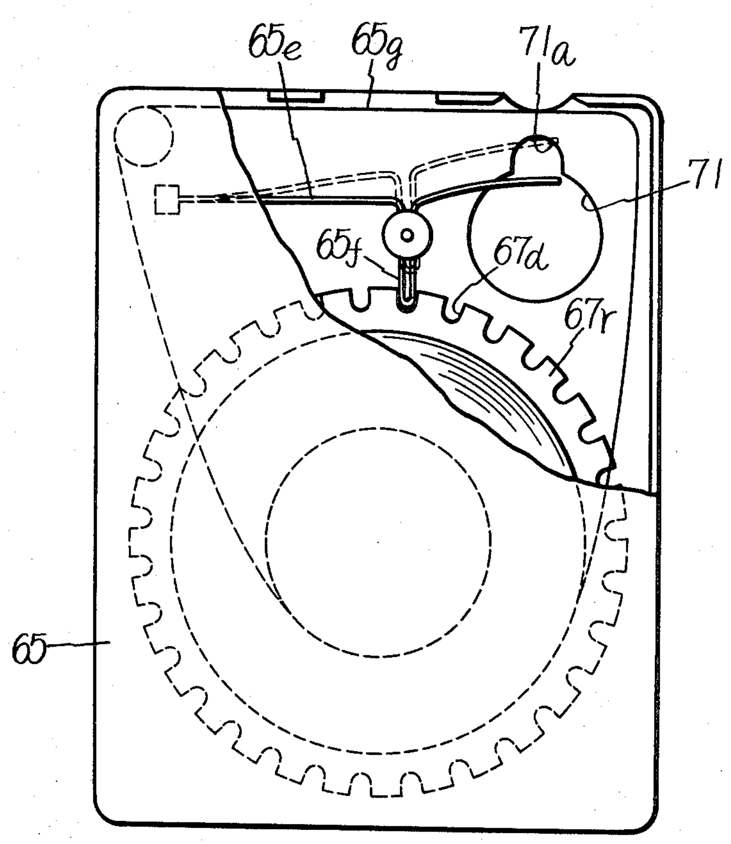
FIG. 20 is a plan view, partly in cross section of the four-track (two-channel) tape cartridge usable with the instrument of this invention.

Referring now to FIG. 20, a detailed description will hereinbelow be given of the four-track tape cartridge 65. In the cartridge 65 a plurality of notches 67*d* are formed in the bottom flange of the reel 67*r* having wound thereon the tape 65*g* and a notch-engaging member 65*f* of the reel stopper 65*e* is snapped into one of the notches 67*d* to lock the reel 67*r* while in the inoperative condition. One end of the stopper 65*e* is fixed in the cartridge 65 and the other end projects into the opening 71 of the cartridge 65.

When the pinch roller 11 comes to stand up through the opening 71 the projecting end of the stopper 65*e* is biased by the sleeve 12*a* of the shaft 12 as indicated by dotted lines in the FIG. to disengage the notch-engaging member 65*f* from the notch 67*d* of the reel 67*r*, rendering the reel 67*r* rotatable.

When the cartridge 65 is removed from the holder 5, a branch opening 7l*a* of the opening 71 of the cartridge 65 facing opposite to the sleeve 12*a* during the operative condition pushes the sleeve 12*a* and consequently the pinch roller shaft 12 in a horizontal direction to bring it down. At this time the conical portion 12*a*' of the sleeve 12*a* makes contact with the branch opening 71*a* of the opening 71 of the cartridge 65, which causes a great increase in the rotational angle of the pinch roller shaft 12 even with a little movement of the cartridge 65. Meanwhile, the edge of the opening 71 of the cartridge 65 pushes the washer 68*c* to move it and the pinch roller 11 away from the sleeve 12*a* on the shaft 12 to allow the passage of the pinch roller 11 through the opening 71 of the cartridge 65 and that 70 of the lower deck plate 1. When the pinch roller 11 has passed a point of the extension of the corners $69_1$ and $69_1'$ of the guide members 69 and 69', the direction of the line of the action of the spring 32 is automatically changed to a direction in which the pinch roller shaft 12 is brought down horizontally. Thus, the pinch roller 11 is automatically brought down horizontally to its inoperative position such as indicated in FIG. 19A and is held under such a condition, permitting smooth removal of the cartridge 65 from the holder 5.

The above example has been described in connection with the case of using the four-track tape cartridge, but the eight-track tape cartridge has generally incorporated therein a pinch roller, in which case the pinch roller of the playback instrument is unnecessary. Generally, the eight-track tape cartridge has no corners such as those 65*a* of the four-track tape cartridge (refer to FIGS. 12B and 13B). Therefore, when the eight-track tape cartridge is inserted into the holder 5 it does not bring down the arm 29C of the lever 29 projecting into the holder 5, so that the pinch roller 11 is held in its inoperative position. Thus, the eight-track tape cartridge can be used with the playback instrument of this invention. It will be apparent that other elements function in exactly the same manner as in the case of using the cartridge of four tracks.

In some cases the four-track tape cartridge does not have such a corner 65*a* as mentioned above and when inserted into the holder 5 it does not bring down the arm 29C, and consequently the pinch roller 11 remains in its inoperative position. In this case, after the cartridge 65 has been completely inserted into the holder 5 the arm 29A is manually turned in a direction of $a_2$ in FIG. 5 to bring the pinch roller 11 to its operative position.

The foregoing has described partially the construction and operation of the principal parts of the instrument of this invention. A description will hereinbelow be given of the operation of the instrument in its entirety.

When the four-track tape cartridge 65 such as depicted in FIG. 20 is pushed into the cartridge holder 5 of the instrument with the pinch roller 11 remaining flat below the lower deck plate 1 as shown in FIG. 1, the corner 65*a* of the cartridge 65 is pressed firstly against the auxiliary roller 62*c* to push it out of the holder 5 and is then urged against the main roller 62*b*, a little pushed out of the holder 5 together with the auxiliary roller 62*c*, to force the main roller 62*b* out of the holder 5, after which the corner 65*a* pushes down the arm 29C of the lever 29 standing substantially upright near the side panel 4 in the holder 5.

With the fall of the arm 29C the rotary shaft 13 of the pinch roller 11 is turned to swing the pinch roller shaft 12 about the shaft 13, by which the pinch roller 11 is caused to stand up through the window 70 of the deck plate 1 and the opening 71 of the cartridge 65 while sliding on the guide members 69 and 69' to move away from the sleeve 12*a* in the axial direction of the shaft 12. At the same time the stopper 65*e* of the reel 67*r* is biased and the pinch roller 11 is pressed against the capstan 14 with the tape 65*g* being gripped therebetween. Meanwhile, the rotary lever 30 is fixed at one end to one end of the rotary shaft 13 of the pinch roller 11 and is turned together with the rotary shaft 13. A coupling lever 38 journaled at one end to the other end of the rotary lever 30 is displaced correspondingly. The other end of the coupling lever 38 has pivoted thereto one end of the engaging lever 25 pivoted at its intermediate portion to a stationary part and hence the engaging lever 25 is turned about its pivot to cause its free end engaged with the groove 23 of the shaft 18 to turn and hence move the shaft 18 in a horizontal direction, that is, in a direction of an arrow $a_5$, as shown in FIG. 7. Consequently, the cam 21 fixedly mounted on the shaft 18 is also moved, in which case the cam disc 21A is urged into contact with the pin 39. That is, in the instrument of this invention all the elements are brought into operative conditions only by the insertion of the cartridge 65 into the holder 5 as described in the foregoing, so that the instrument is easy for handling and accurate in operation. In addition, the channel selection is readily achieved only by pushing the button 8 to actuate the aforementioned ratchet mechanism by which the cam is rotated to change the position of the pin 39 and move the head 15 in a axial direction of the pin 39.

The above-described operations are those in the case of playing back the four-track tape, but since the eight-track tape cartridge incorporates therein a pinch roller, the pinch roller 14 of the instrument is not used in this case. When the eight-track tape cartridge having no corner corresponding to that 65*a* of the four-track tape cartridge 65 is inserted into the cartridge holder 5, the cartridge does not engage the arm 29C of the lever 29, and accordingly the lever 29 and consequently the rotary shaft 13 of the pinch roller is not turned and hence the pinch roller 11 of the instrument does not stand up but remains in its inoperative position such as depicted in FIG. 1. Also in the case of using the eight-track tape cartridge, the other elements function in the same manner as in the case of the four-track tape cartridge. Further, when the pinch roller 11 is inoperative the shaft 18 is moved by the drive lever 25 in a manner to engage the cam disc 22A with the pin 39.

It will be apparent that many modifications and variations may be effected without departing from the scope of the novel concepts of this invention.

I claim:

1. A magnetic tape cartridge player for a four-track tape cartridge and an eight-track tape cartridge comprising a magnetic head, a capstan, a holder formed in a magnetic tape cartridge player for receiving a four-track tape cartridge and an eight-track tape cartridge, said eight-track tape cartridge having therein a pinch roller and the corner portions of said eight-track tape cartridge being taken off at both sides of the forward end face thereof, said four-track tape cartridge having no pinch roller therein, a pinch roller for driving a magnetic medium loaded in said four-track tape cartridge in cooperation with said capstan, two cams corresponding to said four-track and eight-track tape cartridges respectively, each of said two cams having a plurality of cam faces, a pin engageable with each of said two cams, a first means for selectively operating said pinch roller consisting of three arms fixed to a rotary shaft, two of said three arms crossing at approximately right angles to each other, one of said two arms being projected in said holder, a second means consisting of a rotary shaft to which one end of said pinch roller shaft is fixed, a rotary lever, one end of which is connected to said rotary shaft, a lever one end of which is loosely connected to said rotary lever at the other end thereof, a drive lever pivoted at its middle point, one end of said drive lever being loosely connected to said lever at its other end, and a shaft having said two cams and provided with a diametrically reduced portion, the free end of said drive lever being engaged with said diametrically reduced portion, and means for engaging said pin with one of said two cams in association with said first means, whereby when said four-track cartridge is inserted into said holder one of the corners of said four-track cartridge pushes down said arm of said first means projected into said holder, in accordance with the rotation of said rotary shaft of said first means, said pinch roller shaft being rotated to shift said shaft for engaging one of said cams corresponding to said four-track tape cartridge with said pin through said rotary lever, said lever and said drive lever but when said eight-track cartridge is inserted into said holder said first means is not driven by said eight-track cartridge because said eight-track cartridge has no corners to keep said pinch roller of said tape cartridge player in the nonoperative condition and said pin in contact with said cam corresponding to said eight-track tape cartridge.

2. A magnetic tape cartridge player as claimed in claim 1 wherein means are provided for smoothly guiding a cartridge into said holder.